United States Patent [19]

Candy et al.

[11] 3,911,317

[45] Oct. 7, 1975

[54] CURRENT BOOTSTRAP TO REDUCE INTERELECTRODE CAPACITANCE EFFECT IN A VACUUM TUBE

[75] Inventors: James Charles Candy, Convent Station; Michael Edward Lukacs, Wanamassa, both of N.J.

[73] Assignee: Bell Telephone Laboratories, Incorporated, Murray Hill, N.J.

[22] Filed: Aug. 24, 1973

[21] Appl. No.: 391,458

[52] U.S. Cl. ........................ 315/30; 330/27; 330/76

[51] Int. Cl.$^2$ .......................................... H01J 29/52

[58] Field of Search .................. 315/30; 330/27, 76; 178/7.3 R

[56] References Cited

UNITED STATES PATENTS

| | | | |
|---|---|---|---|
| 2,201,794 | 5/1940 | Schlesinger | 330/76 |
| 2,218,720 | 10/1940 | Rinia | 315/30 |
| 2,540,646 | 2/1951 | Bernard | 315/30 |

OTHER PUBLICATIONS

Terman, F. E., *Electronic and Radio Engineering, N.Y., McGraw–Hill, 1955, p. 428–429.*

*Primary Examiner*—Maynard R. Wilbur
*Assistant Examiner*—T. M. Blum
*Attorney, Agent, or Firm*—C. S. Phelan

[57] ABSTRACT

A drive circuit using a current drive for the cathode of a cathode ray tube has a constant voltage, circuit node between the video signal source and the cathode of the tube. That node is coupled by a signal path to the tube control grid for recirculating interelectrode capacitance current. The signal path is shown in the forms of a galvanic connection, a capacitive connection, and an amplifier connection.

11 Claims, 3 Drawing Figures

CURRENT BOOTSTRAP TO REDUCE INTERELECTRODE CAPACITANCE EFFECT IN A VACUUM TUBE

BACKGROUND OF THE INVENTION

1. Field of the Invention

This invention relates to drive circuits for vacuum tubes and it relates in particular to cathode drive circuits for a cathode ray tube (CRT).

2. Description of the Prior Art

When the current in a vacuum tube is controlled by applying signal voltage between the grid and cathode, the tube is known to exhibit a nonlinear characteristic portion at low grid signal levels. Cathode ray tubes exhibit similar characteristics; but contrary to most other vacuum tube cases, the cathode ray tubes are often required to work in the low video signal region in order to achieve faithful reproduction of dark shades. The CRT nonlinear characteristic is compensated in various ways. One such way is to employ a large series cathode circuit resistance. Such a large resistance requires a substantial increase in CRT supply voltage for even the small beam currents utilized in the CRT. In addition, the large cathode circuit resistor has a substantial self capacity that tends to offset some of the compensating effect at high frequencies.

When a current that is proportional to an applied signal is drawn from the cathode of a CRT, the inherent grid-cathode interelectrode capacitance of the tube causes certain picture distortions in response to sharp changes in the level of brightness in the picture that is to be displayed. These distortions result from charging and discharging currents, hereinafter called simply "charging current," for the grid-cathode capacitance. That charging current flows in the cathode circuit and the video signal source so that it is affected by video signal control, but it does not have a correspondingly controlled effect on screen brightness. The distortions result from the time required to charge and discharge the interelectrode capacitance in response to rapid changes in video signal intensity. Typical distortions are defocusing of the edges of bright picture regions which are adjacent in the display to much darker regions. In color tubes the defocusing effect is often different for each color gun of the tube so that the defocused edges take on an annoying rainbow appearance.

Prior art schemes for either balancing or tuning out inherent grid-cathode capacitance effects are unsatisfactory because they require critical circuit component adjustments. In addition, such adjustments can be relatively easily disturbed, thereby necessitating realignment of the video system in the field.

STATEMENT OF THE INVENTION

The foregoing problems of drive circuits for vacuum tubes are alleviated in an illustrative embodiment of the present invention in which a substantially constant voltage node is included in the cathode circuit of the tube between a control signal source and the cathode. A signal coupling path is established, separately from the cathode current path, between the aforementioned voltage node and the tube control grid in order to provide a closed current loop, excluding the signal source, for the charge current of the grid-cathode inherent interelectrode capacitance.

It is one feature of the invention that it is relatively simple to implement, and usually requires no tuning or critical adjustments.

It is a feature of another embodiment of the invention that the coupling signal path includes amplifier circuits which allow the path to perform a similar current looping function for charging current for distributed capacitance along the cathode circuit portion of the tube drive circuit.

BRIEF DESCRIPTION OF THE DRAWINGS

A more complete understanding of the invention and the various features, objects, and advantages thereof may be obtained from a consideration of the following detailed description in connection with the appended claims and the attached drawings in which:

DETAILED DESCRIPTION

In all of the illustrative embodiments herein described for the present invention, a CRT with a single electron gun is illustrated. However, the invention is equally applicable to other vacuum tube arrangements and to such arrangements which employ multiple electron guns, as one typically finds in color CRT arrangements.

Figure 1:
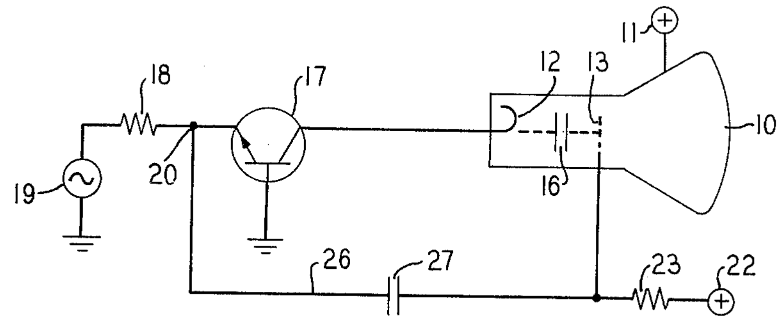
FIG. 1 is a schematic diagram of a CRT drive circuit utilizing the present invention.

In FIG. 1, a vacuum tube, such as the cathode ray tube 10, is provided with a high voltage operating potential source 11 connected to the anode or other similar electrode of the tube. Source 11 is schematically represented by a circled polarity sign, positive in this case, and indicates connected of a source terminal of the indicated polarity to the illustrated circuit point and connection of a terminal of opposite polarity to electric circuit ground. Other operating potential sources in the drawing are similarly represented. The tube 10 has a cathode 12, a control grid 13, and an inherent interelectrode capacitance between the cathode and control grid as schematically represented by a capacitor 16 which is connected between those electrodes by a dotted lead. Other details of the tube 10 comprise no part of the present invention and are thus not specifically illustrated in the drawing. Thus, an electron beam emanating from the cathode 12 is projected into the picture screen display portion of the tube at the right-hand (as illustrated) end thereof in screen positions determined by beam deflection arrangements not shown.

The electric current, corresponding to the beam current, from the cathode 12 finds a return path to the source 11 through the collector-emitter path of a transistor 17, a current limiting resistor 18, and a video signal source 19 to ground. Transistor 17 is illustrated as an n-p-n junction transistor with its collector electrode connected to the cathode 12 and its emitter electrode connected through a circuit node 20 and the resistor 18 to the source 19. The base electrode of transistor 17 is coupled to ground. A source 22 of positive potential provides, through a resistor 23, a fixed bias potential for the control grid 13. Transistor 17 is biased for operation in the linear portion of its characteristic in response to current from source 19. The operation of the video signal source 19 modulates the current flowing in the cathode 12 and in the remainder of the tube 10. Thus, a current drive is applied to the cathode of the CRT.

As is known in the art, the collector electrode of transistor 17 presents a high resistance to the flow of current from the cathode 12 so that only the small additional resistance of resistor 18 need be provided in the tube current path for current limiting purposes in order to achieve the desired very high resistance effect which is needed to compensate for CRT nonlinearity. Consequently, the voltage with respect to ground at cathode 12 fluctuates readily in response to the tube current variations produced by the modulating effect of the video signal source; but those variations in voltage do not produce corresponding voltage variations at the emitter electrode and node 20 of transistor 17. Since the resistance of resistor 18 is much larger than the resistance seen between base and emitter electrodes of transistor 17 when that transistor is operating in its linear region, substantially the full output voltage of the source 19 is developed across resistor 18. The node 20 remains at a substantially constant low voltage and is thus a virtual ground. In this case, node 20 is at a voltage approximately one transistor junction drop below ground. Source 22 is chosen to bias grid 13, and hence incidentally the cathode 12, so that there is adequate voltage to operate the collector of transistor 17 in a linear mode. In some applications the grid-cathode potential alone is adequate for the purpose and source 22 can be zero as will hereinafter be further discussed.

A lead 26 and a capacitor 27 provide signal coupling between the node 20 and control grid 13 which effects feedback from the grid to the node. The capacitance of capacitor 27 is at least 10 times the capacitance of the grid-cathode capacitor 16, but the relationship is not critical because capacitor 27 simply provides alternating current coupling in the signal path between node 20 and grid 13. Thus, that node and grid are normally at approximately the same signal level. The resistor 23 connects grid 13 to source 22 yet the resistor is large enough to prevent video signal from flowing away from the tube current path and back to source 19; and capacitor 27 blocks applications of direct current from source 22 to node 20.

Considering the circuit of FIG. 1 first without the lead 26 and capacitor 27, it will be appreciated that the essential charging and discharging of capacitor 16 in response to fast signal variations must take place through a circuit loop including transistor 17, resistor 18, source 19, and ground, as well as source 22 and resistor 23. Consequently, the video signal must operate on a signal current $I_s$ which is the sum of the CRT beam current $I_b$ and the capacitor 16 current $I_c$ during those fast signal changes. The result is, of course, a slower change in the beam current from the screen of tube 10 and the consequent aforementioned defocusing and color separation. However, with the current bootstrap coupling provided by lead 26 and capacitor 27, the interelectrode capacitor 16 sees a charging current loop path which bypasses the source 19. Thus, the charging current component appearing at the emitter electrode of transistor 17 flows from the node 20 through lead 26 and capacitor 27 back to the interelectrode capacitor 16. Consequently, the signal current flowing in source 19 is equal to the tube current for tube 10. Absent rapid fluctuations in the intensity of beam current for CRT 10, capacitor 16 is a high impedance and no current flows in lead 26 and capacitor 27. In the presence of such fluctuations, charge changes on capacitor 16 are accomplished much more rapidly, without detracting from the video signal current, so the picture focus is relatively unaffected by interelectrode capacitor 16. Likewise, transistor 17 and resistor 18 cooperate in the cathode current path for tube 10 to provide the necessary very high resistance between cathode 12 and ground to compensate for the CRT low signal level nonlinearity as is desired.

A typical set of circuit values for producing these aforementioned results would be:

| | |
|---|---|
| Source 11 | 20,000 Volts |
| Source 19 | 0.3 to −5 Volts |
| Resistor 18 | 4700 Ohms |
| Resistor 23 | 100 Kilohms |
| Capacitor 27 | 0.001$\mu$F |
| Source 22 | +10 Volts |

Figure 2:
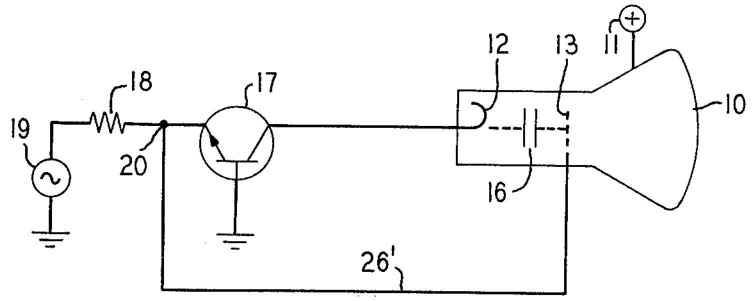
FIG. 2 is a modification of the circuit of FIG. 1 which does not require a separate fixed bias source for the CRT control grid.

In FIG. 2 there is shown a modification of the circuit of FIG. 1 which is simplified by the elimination of the grid bias source 22 and associated resistor 23. In this embodiment the capacitor 27 is also eliminated so that the lead 26' provides a galvanic connection between control grid 13 and the node 20. Source 11 and resistor 18 retain substantially the same values in this embodiment, and the source 19 is also the same even though the control grid 13 is now at the virtual ground of node 20. Thus, operation of the circuit of FIG. 2 is similar to the operation of the circuit of FIG. 1; that is, charging current for the interelectrode capacitor 16 is coupled between node 20 and grid 13 by way of lead 26' so that the signal current in source 19 is substantially the same as the total picture screen current in tube 10. In FIG. 2, however, the voltage at cathode 12 should not be allowed to swing negatively with respect to grid 13 since that would bias transistor 17 into saturation and shunt signal current to ground.

Figure 3:
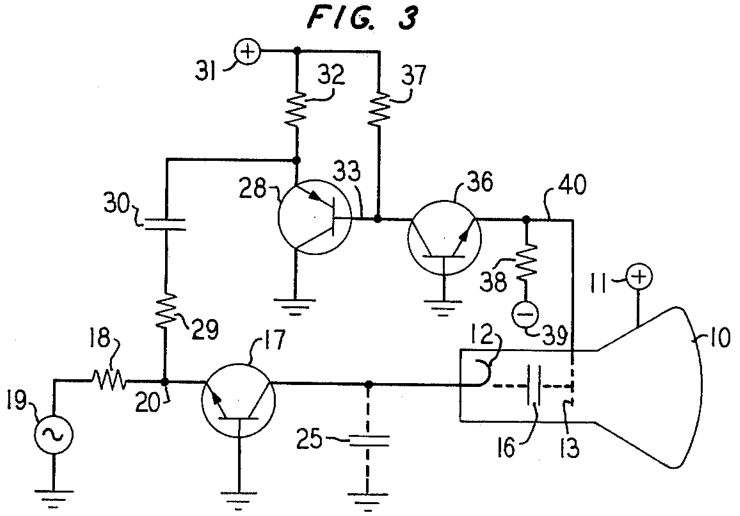
FIG. 3 is a schematic diagram of an additional modification for systems wherein there is significant distributed capacitance in the CRT cathode circuit in addition to the inherent interelectrode capacitance of the CRT.

FIG. 3 depicts a further modification of the invention which is useful in applications wherein circuit connections, such as the lead between the collector electrode of transistor 17 and the cathode 12, have a significant distributed capacitance to ground as schematically represented in FIG. 3 by a capacitor 25 which is connected by dotted leads between the cathode lead and ground. In this case current appearing at the emitter electrode of transistor 17 includes the screen current of tube 10, the charging current for interelectrode capacitor 16, and an additional component of charging current for the distributed capacitor 25.

A common collector connected p-n-p junction transistor 28 draws a portion of its emitter current from the node 20 by way of a resistor 29 and a capacitor 30. The remainder of the emitter current is provided from a positive source 31 by way of an emitter resistor 32. The collector elelctrode of transistor 28 is grounded, and the base electrode thereof is connected by a lead 33 to the collector electrode of a common base connected n-p-n junction transistor 36, having the base electrode thereof grounded. A resistor 37 is connected between source 31 and the collector electrode of transistor 36, while a resistor 38 couples the emitter electrode of the transistor to a negative source 39. A lead 40 is connected between control grid 13 and the emitter electrode of transistor 36.

Circuits of transistors 28 and 36 comprise the stages of an amplifier 35 which has its signal power output coupled through resistor 29 and capacitor 30 to receive current from node 20, and the amplifier has a signal input path at lead 40. Both transistors are operated in the linear portions of their characteristics. Resistors 29 and 37 are assigned resistance values to establish the gain through the aforementioned amplifier circuits from lead 40 to node 20. In an application wherein the charging currents for capacitors 16 and 25 are approximately the same, the gain is fixed at about two, and resistor 37 is approximately twice the resistance of resistor 29. Capacitor 30 simply provides alternating current coupling between node 20 and the emitter electrode of transistor 28. The potential at lead 33 is approximately equal to the product of the resistance of resistor 37 and the charging current for interelectrode capacitor 16. This voltage fixes the conduction level for transistor 28, in the linear portion of its characteristic, at a current level which requires the sum of the charging currents for capacitors 16 and 25 to supplement current obtained from source 31. Thus, transistor 28 diverts those charging current components from the normal path for current for tube 10, and source 19 carries only a signal current which is substantially the same as the picture screen current of CRT 10. It can now be seen that charging current for interelectrode capacitor 16 returns to grid 13 from node 20 by way of transistor 28, ground, source 31, and transistor 36. Similarly, charging current for capacitor 25 returns from node 20 by way of transistor 28 and ground to that capacitor.

During intervals of no rapid changes in beam intensity in tube 10, capacitors 16 and 25 are high impedances and draw no substantial current. Consequently no current flows in lead 40. The emitter current of transistor 36 is then equal to the bias current provided by source 39 and resister 38, and the transistor 36 collector voltage remains at a constant value determined by the bias provided from source 31 by way of resistor 37. Since the collector potential of transistor 36 is constant, the base electrode of transistor 28 must be the same. The emitter of transistor 28 is also similarly constant. Consequently, the potential difference across capacitor 30 is constant; and no supplementary current is drawn from node 20 via resistor 29 and capacitor 30.

A typical set of the added circuit values for the embodiment of FIG. 3 is as follows:

| | |
|---|---|
| Resistor 29 | 10 kilohms |
| Resistor 32 | 4.7 kilohms |
| Resistor 37 | 22 kilohms |
| Resistor 38 | 47 kilohms |
| Capacitor 30 | 0.01 microfarads |
| Source 31 | +10 volts |
| Source 39 | −10 volts |

Although the present invention has been described in connection with particular embodiments thereof, it is to be understood that additional embodiments and modifications which will be obvious to those skilled in the art are included within the spirit and scope of the appended claims.

What is claimed is:

1. In combination, a cathode ray tube having at least a cathode and an anode between which a ray current flows during tube operation, said tube further having a control grid, a current path for said ray current external of said tube and including a constant voltage node, means in said path, and coupled through said node to said cathode, for modulating said cathode ray current, said tube having an inherent grid-cathode interelectrode capacitance through which a current flows and causes distortion of the effect of said modulating means on said ray current, and means, separate from said ray current path and connected between said control grid and said voltage node, for reducing the effect of said distorting current.

2. The combination in accordance with claim 1 in which said reducing means comprises a wire connected between said control grid and said node.

3. The combination in accordance with claim 1 in which said modulating means comprises a source of modulating signals, a grounded base transistor is provided in said path and has a collector electrode connected to said cathode and an emitter electrode connected to said node, and a resistor is connected in series in said path between said node and said source.

4. The combination in accordance with claim 1 in which said reducing means comprises a capacitor connected between said control grid and said node, said capacitor having a capacitance at least 10 times as large as said interelectrode capacitance.

5. The combination in accordance with claim 1 in which said reducing means comprises an amplifier having an input, an output, and a predetermined gain, and means for connecting said amplifier output and input to said node and said control grid, respectively.

6. The combination in accordance with claim 5 in which said amplifier comprises a common base connected transistor amplifier having an input connected to said control grid, and a common-collector connected transistor amplifier coupling an output of said common-base amplifier to said node, 7. The combination in accordance with claim 6 in which said connecting means includes a first resistor, said common-base amplifier includes in the collector circuit thereof a second resistor, and said gain is a function of the ratio of the resistance of said second resistor to the resistance of said first resistor.

8. The combination in accordance with claim 7 in which said path includes distributed capacitances, and said ratio is made more than one in order to provide a loop path for charging current for both said distributed capacitances and said interelectrode capacitance.

9. In combination, a cathode ray tube having at least a control grid and having a cathode and an anode between which ray current flows during tube operation, said tube further including inherent interelectrode capacitance between said control grid and cathode, ray intensity modulating means comprising a modulating signal source connected between said cathode and said anode and means, connected in series between said source and said cathode, for establishing a constant voltage circuit point at the circuit junction common to said source and said establishing means, and means, connected from said control grid to said junction, for charging said interelectrode capacitance.

10. In combination, a multielectrode vacuum tube having a controllable tube current and having a predetermined inherent interelectrode capacitance between first and second electrodes thereof, means for current driving said first electrode, said driving means including a current path external to said tube for said tube current, means in said current path for controllably varying said tube current, and means in said path for connecting said varying means to said first electrode, said connecting means including a circuit point of substantially constant voltage and excluding any other electrode of said tube, and means, including a connection between said circuit point and said second electrode and excluding said driving means, for circulating charging current for said capacitance.

11. A video signal driving circuit for a cathode ray tube including at least a cathode, a control grid, and an inherent interelectrode capacitance therebetween, the circuit being characterized in that a video signal source is connected in the cathode current path between the cathode and a reference potential terminal for modulating current in the cathode, a constant voltage node is included in the path between the source and the cathode, and an electric signal coupling circuit is connected between the control grid and the node.

* * * * *